United States Patent [19]
Deckman et al.

[11] Patent Number: 5,968,366
[45] Date of Patent: *Oct. 19, 1999

[54] ZEOLITE CONTAINING COMPOSITION WITH A SELECTIVITY ENHANCING COATING

[75] Inventors: Harry William Deckman, Clinton, N.J.; Edward William Corcoran, Jr., Easton, Pa.; James Alexander Mc Henry, Washington; Wenyih Frank Lai, Fairlawn, both of N.J.; Lothar Ruediger Czarnetzki, Leiderdorp, Netherlands; William Edward Wales, Phillipsburg, N.J.

[73] Assignee: Exxon Research and Engineering Company, Florham Park, N.J.

[ * ] Notice: This patent is subject to a terminal disclaimer.

[21] Appl. No.: 08/909,981

[22] Filed: Aug. 12, 1997

Related U.S. Application Data

[63] Continuation of application No. 08/499,718, Jul. 7, 1995, abandoned, which is a continuation-in-part of application No. 08/272,352, Jul. 8, 1994, Pat. No. 5,716,527.

[51] Int. Cl.⁶ ............................ B01D 61/00; B01D 39/00
[52] U.S. Cl. ................... 210/651; 210/640; 210/490; 210/500.25; 210/506; 585/818; 95/45; 95/50
[58] Field of Search .............................. 210/500.25, 490, 210/506, 650, 651, 640; 585/818; 427/247; 95/45, 50

[56] References Cited

U.S. PATENT DOCUMENTS

| | | | |
|---|---|---|---|
| 4,214,020 | 7/1980 | Ward et al. | 427/296 |
| 5,362,522 | 11/1994 | Barri et al. | 427/435 |
| 5,716,527 | 2/1998 | Deckman et al. | 210/650 |

FOREIGN PATENT DOCUMENTS

| | | |
|---|---|---|
| 1235684 | 4/1988 | Canada . |

*Primary Examiner*—Ana Fortuna
*Attorney, Agent, or Firm*—Gerard J. Hughes

[57] ABSTRACT

Compositions useful in separating molecules or catalytic conversions comprise a substrate, a zeolite or zeolite-like layer, a selectivity enhancing coating in contact with the zeolite layer and optionally a permeable intermediate layer in contact with the substrate the zeolite layer being in contact either with the substrate or the optional intermediate layer.

17 Claims, 6 Drawing Sheets

ZEOLITE CONTAINING COMPOSITION WITH A SELECTIVITY ENHANCING COATING

This application is a Continuation Ser. No. 08/499,718 filed on Jul. 7, 1995, abandoned which is a Continuation-in-Part of U.S. Ser. No. 272,352 filed on Jul. 8, 1994 and attorney docket number LAW300 filed on Jun. 7, 1995, now U.S. Pat. No. 5,716,527.

FIELD OF THE INVENTION

The present invention is directed toward a supported zeolite composition containing a coating which enhances the permselective properties of the composition.

BACKGROUND OF THE INVENTION

Fabrication of practical zeolite membranes has long been a goal of separation science. For a zeolite membrane to be practical, it must have a high flux and selectivity for the desired permeate molecule(s). Obtaining such a membrane has been difficult because of defects and interparticle voids inherent to the zeolite film. This is especially true for membranes grown from classical zeolite synthesis routes described in the literature. These membranes have a heterogeneous crystal structure within the membrane layer and require an enormous (>50 microns) layer thickness to seal pinholes and void structures. What is needed in the art is a thin, continuous zeolite layer with few defects, and a method, or methods, to 'heal' any remaining defects and void structures and stabilize these to subsequent severe conditions of operation.

Membranes described in the literature are formed with several zones (larger crystals grown on top of smaller crystals) across the membrane thickness. In several zones, the crystals are not grown into a dense mat that is free of intercrystalline voids To obtain a permselective zeolite membrane, the above zeolite layers (comprised of zones) must be grown to an excessive thickness (>50 microns) to seal off voids and defects within the membrane system. This introduces a great mass transfer resistance resulting in very low fluxes through the membrane layer.

Alternately, a method (or methods) to 'heal' void structures and defects in the membrane layer, without having a negative effect on permeate flux or selectivity, would eliminate the need to grow excessively thick zeolite layers. Most successful membrane technologies employ some form of reparation coating which repairs existing defects or holes in membranes. Reparation techniques either selectively seal defects and holes or attenuate their effects with a permeable coating that covers the membrane surface. Reparation techniques which selectively seal defects are often based on the selective application of a film forming material which acts as a diffusion barrier. Reparation technologies which attenuate rather than selectively seal defects or holes apply a permeable layer over the entire surface of the membrane. The mass transfer resistance of this layer must be sufficient to attenuate the effect of defects in the membrane and improve the permselective properties of the membrane. In all events reparation technologies improve the permselective properties of membranes with existing defects or holes. Defects and holes form nonselective permeation pathways through the membrane and reparation decreases the flux through these nonselective pathways relative to permselective pathways through the reset of the membrane.

A large number of reparation coating technologies have been developed for organic membranes. Because of differences in materials, conditions of use and physics of the transport mechanism through different membranes, reparation coatings developed for organic membranes cannot be used with any predictability regarding reporting inorganic and zeolite membranes. Coating materials which have been used to reparate polymer membranes have been generally polymer and epoxy materials. When they are used to reparate polymer membranes by selectively sealing defects, film forming polymers or epoxies are applied in a manner such that they are selectively absorbed into defects or holes. For example, hollow fiber membrane modules containing a small percentage of broken fibers have been reparated by selectively filling broken fibers with epoxy. When they are used to attenuate defects, permeable polymers or epoxies are applied as a thin film coating over the organic membrane surface. The polymer and epoxy materials used to seal and attenuate defects in polymer membranes degrade in the harsh chemical environments and high temperature operations in which inorganic and zeolite membranes are used.

Methods used to reparate organic membranes are not likely to be applicable to microporous or mesoporous inorganic membranes. This is especially true for zeolite membranes for two reasons. First, since materials used to reparate organic membranes are organic in nature, wettability is an issue with oxide materials such as zeolites, or any system that is heavily hydroxylated at the surface. It is not obvious that an organic polymer would adhere to the zeolite or support surface much less remain intact to seal voids/defects. Secondly, zeolite membranes take advantage of the well defined pore structure of zeolitic materials, reparation using organic polymers may seal these pores in addition to the desired voids/defects; it is not likely that the material will be able to discriminate between void structures or defects and zeolite pores. If the coating material enters the pore structure of the zeolite, it can occlude or block the pore structure. When it occludes the pore structure, it hinders diffusion through the zeolite and no transport occurs through blocked pores. Even when the coating material does not enter the pore structure, it can occlude pore mouths at the surface of the zeolite and hinder diffusional transport through the membrane. There have been proposals that zeolite membranes grown by hydrothermal synthesis could be reparated by deposition of a material that is different from that used to form the zeolite layer in the membrane (see for example EP 481,660A1, S.A.I. Barri and G. J. Bratton, and T. de V. Naylor, British Petroleum, 1991), however no specific recipe for reparation has been presented.

SUMMARY OF THE INVENTION

It has been discovered that thin coatings can preserve or enhance the permselective properties of continuous, intergrown layers of zeolite crystals during separation applications. Certain coatings are capable of preventing the formation of defects and voids in the layer during high temperature use or testing which can lead to a loss of molecular selectivity in separation processes. When acting in a preventative sense, these coatings may serve to stabilize the separation between the intergrown zeolite crystals or 'cushion' crystals within the zeolite layer, alleviating or dispersing mechanical stresses and deformations arising from harsh process environments. These coatings can also serve a second purpose in that they can act to seal defects in the zeolite layer, although, as described above, they can be advantageous when used in the absence of any defects or voids. It is critical to 'heal' defects and voids since they provide nonselective permeation pathways which results in poor separations performance. These two functions of stabilization and reparation of defects or voids in the zeolite layer enhance the selectivity of the composition, hence, we refer to the coating as a selectivity enhancing coating (sec).

Accordingly, this invention provides a new composition useful, among other things, for separations of molecules and catalytic conversions, which comprises a substrate, a zeolite or zeolite-like material in contact with the substrate, and a selectivity enhancing coating in contact with the zeolite. In a preferred embodiment of the invention a permeable intermediate layer may be incorporated between the substrate and the zeolite layer. Such compositions are often referred to in the art as zeolite membranes and the instant compositions can be used as such.

DETAILED DESCRIPTION OF THE INVENTION

Figure 1:
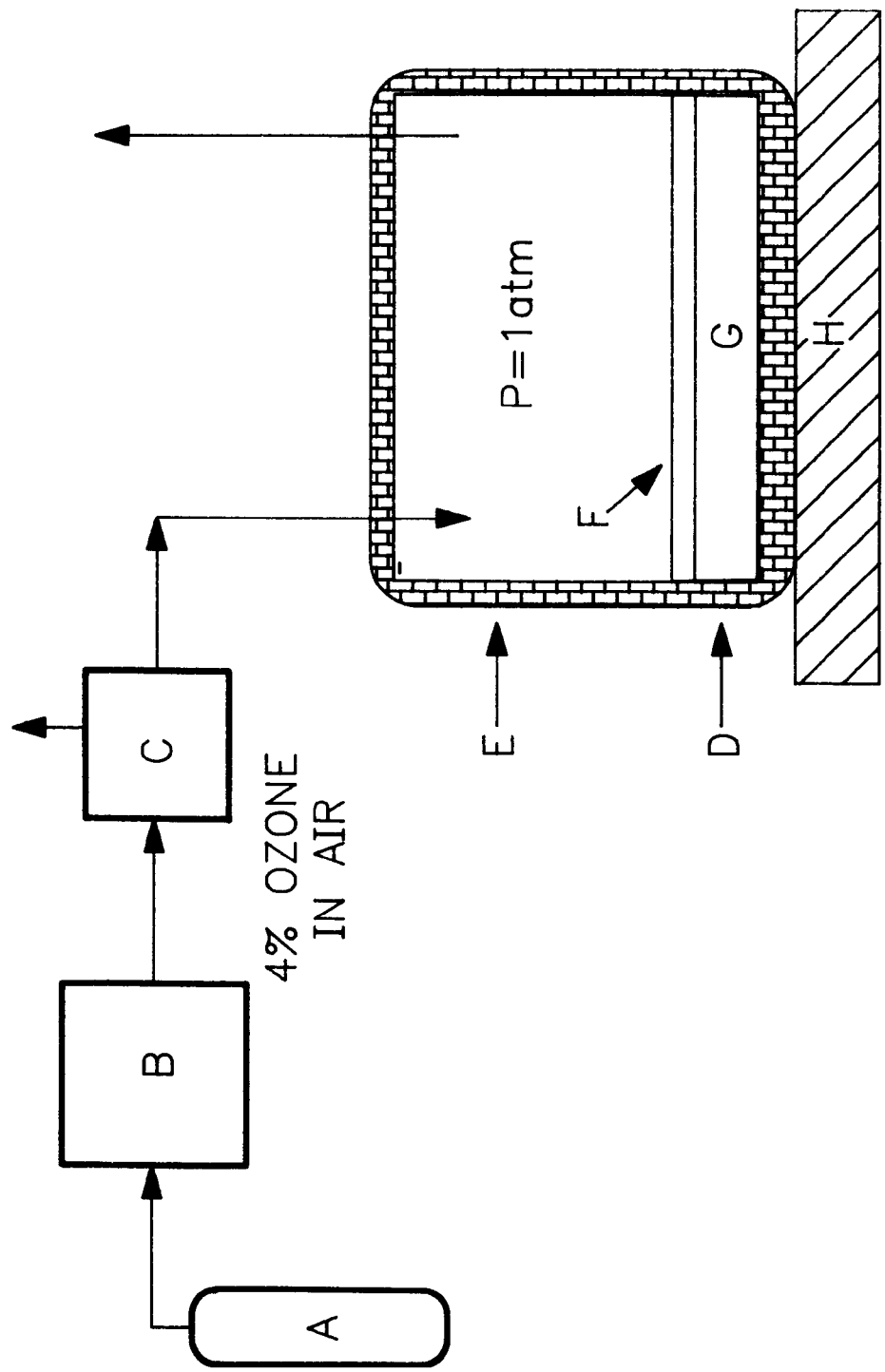
FIG. 1 is a diagram of the Cold Wall Reactor used for applying a selectivity enhancing coating using interfacial gas/liquid CVD. In the figure, (A) is the air tank, (B) is the ozone generator, (C) is the mass flow controller, and (D) is the membrane holder. (E) is the Cold Wall Reaction Vessel, (F) is the zeolite layer, (G) is the substrate, and (H) is the heating surface.

The present invention describes a new type of supported zeolite composition with a selectivity enhancing coating (SEC). The selectivity enhancing coating prevents the composition's zeolite layer from developing defects during process applications. These defects formed during process application on the compositions not containing the selectivity enhancing coating are found to degrade the permselective properties of the composition. The selectivity enhancing coating can also reparate defects, voids, and interparticle spaces that existed in the zeolite layer of the composition before it was used for process applications. Process applications in which the compositions can be used include separations of molecular species, catalytic reactors and reactors which combine reaction and separation. The composition contains at least a porous substrate, a zeolite layer, and a selectivity enchaining coating. The substrate may also be referred to herein as a support. The composition may also contain a permeable intermediate layer between the support and the zeolite layer. The selectivity enhancing coating is in contact with the zeolite layer. The zeolite layer is in contact with either the substrate or the intermediate layer. In a preferred composition the zeolite crystals of the zeolite layer are grown so that they form a continuous film.

The present invention has a continuous zeolite layer formed on a support (substrate), or on a permeable layer intermediate between the zeolite and support. Advantageously, the crystals are contiguous, i.e., substantially every crystal is in contact with one or more of its neighbors. Such contact may be such that neighboring crystals are intergrown, provided they retain their identity as individual crystals. In a preferred embodiment, the crystals in the layer are closely packed.

It is preferred that the zeolite crystals are intergrown in the zeolite layer so that nonselective permeation paths through the layer are blocked by the narrowest point of approach between crystals. Non-selective permeation pathways are taken to be permeation pathways which exist at room temperature that do not pass through the zeolite crystals. This blockage of nonselective permeation pathways can exist at room temperature after a template which occludes the pore structure is removed from the zeolite crystals. Templates which are used to aid in the crystallization of zeolites are typically removed by a calcination step; intergrown zeolite crystals (within a layer) should exhibit a blockage of nonselective permeation pathways after the template is removed. A preferred dense zeolite layer is formed such that there exists at least one point on a crystal that is less than 20 Å from a point on an adjacent crystal. Between these points can be inorganic oxide material that restricts nonselective permeation of molecules through the layer. The spacing between zeolite crystals in this dense intergrown zeolite layer can be established by TEM or with dye permeation tests.

The absence of nonselective permeation paths can be detected by the ability to prevent the permeation at room temperature (~20° C.) of dye molecules through the layer after any template is removed from the pore structure. Dye molecules which can be chosen to detect non-selective permeation pathways through the layer should have minimum dimensions which are larger than the controlling aperture through the zeolite and the size of the dye molecule should be less than 20 Å in at least one dimension. Nonselective pathways transport dye molecules which are larger than the pore size of the zeolite. The dye molecules should be carried in a solution made with a solvent which can be transported through the zeolite pore structure and the zeolite layer should not be allowed to pick up foreign contaminants (such as water) before being tested. The most preferred zeolite layers in the present invention block the permeation of dye molecules at room temperature through the zeolite layer. All of the dye molecules chosen have sizes less than 20 Å. The lack of permeation at room temperature of dye molecules with sizes less than ~20 Å demonstrates that non-selective permeation pathways with sizes less than ~20

Å are blocked. It should be noted that this test does not have to be performed with a dye molecule, and any molecular species that can be detected having a size less than 20 Å and greater than the zeolite pore dimension can be used. The advantage of using a dye molecule is that it can be readily detected by optical means. An example of dyes that can be detected by optical means (and have molecular sizes less than 20 Å) include Rhodamine B and other laser dyes.

The zeolite crystals forming the zeolite layer of the composition may be true zeolites or zeolite-like materials including molecular sieve materials. As molecular sieves, there may be mentioned a silicate, an aluminosilicate, an aluminophosphate, a silicoaluminophosphate, a metalloaluminophosphate, a metalloaluminophosphosilicate, or a stannosilicate. The preferred molecular sieve will depend on the chosen application for example, separation, catalytic applications, and combined reaction and separation. These are many known ways to tailor the properties of the molecular sieves, for example, structure type, chemical composition, ion-exchange, and activation procedures. Representative examples are molecular sieves/zeolites of the structure types AFI, AEL, BEA, CHA, EUO, FAU, FER, KFI, LTA, LTL, MAZ, MOR, MEL, MTW, OFF, TON and, especially, MFI. Some of these materials while not being true zeolites are frequently referred to in the literature as such, and this term will be used broadly in the specification below to include such materials.

The thickness of the zeolite sieve layer is advantageously within the range 0.1 to 150 μm, preferably from 0.5 to 20 μm.

Advantageously, the zeolite layer is substantially free of voids. Voids used herein means spaces between adjacent zeolite crystals larger than ~5000 Å. It is preferred that the voids between zeolite crystals are less than 40 Å. Layers which are substantially free of voids contain less than 20 volume % of voids in the zeolite layer, and preferably less than 0.1% voids in the zeolite layer. Such zeolite layers which are substantially free of voids are taken to be dense.

Advantageously, zeolite layers used with the present invention should be substantially free of defects. Defects are connected voids and are spaces between zeolite crystals extending through the thickness of the zeolite layer. It is preferred that any defects in the zeolite layer be formed from small voids. It is preferred that the number of defects with sizes greater than 40 Å be <10000 per square inch, and preferably <1000 per square inch. The number of defects with sizes larger than 2000 Å should be less than 1000 per square inch and preferably less than 100 per square inch.

The zeolite layer can have either a shape preferred orientation, a crystallographically preferred orientation, or both. Shape or crystallographically preferred orientations occur because of the control of the relative rates of nucleation and growth offered by the synthesis procedure. Specifically, during synthesis, the rate of growth can be made to dominate the rate of surface nucleation of new crystals or incorporation of new crystals. Incorporation of new crystals is defined as attachment onto the surface of the growing zeolite layer of a crystal formed in the synthesis mixture. Since the growth rate can dominate renucleation or incorporation, crystals can competitively grow for long periods of time without significant addition of new crystals into the growing layer. Since the growing layer is composed of individual crystals and the synthesis method seeks to prevent renucleation or incorporation of crystals, the resulting composition can have shape, crystallographically preferred orientation, or both. Shape orientation occurs because the crystals grow with preferred regular habits (or morphology) at the surface of the zeolite layer. A regular habit (or morphology) is taken to be a regularly shaped outline of a particular crystallographic grain in the layer. Regularly shaped outlines are defined as those which can be fitted or packed together so that there are no interconnected spaces or voids between crystals. Interconnected voids will form a pore structure. A few examples of regular habits with regular shapes are columnar, cubic, rectangular, and prismatic. Spherical, irregular and elliptical shapes are not considered to be regular habits. In a shape preferred orientation, defined layers will have the same regular habit. This can be measured by cleaving or fracturing the substrate on which the layer is grown and examining the cross-sectional morphology of the zeolite layer with a scanning electron microscope. Examining the surface of the as grown zeolite layer can also give additional information concerning the shape preferred orientation in the layer. A layer with shape preferred orientation is taken to be one which has more than 90% of the crystals within one layer inside the zeolite layer exhibiting self similar regular habits. The self similar requirement means that the same regular habit it exhibited within a layer that can be drawn in the electron micrograph of the cross-section of the zeolite layer, however even though the shapes are the same, they do not all have to be the same size. Because of the growth mechanism of the zeolite layer, it is possible to have one shape preferred orientation at the bottom (base) of the layer and another shape preferred orientation in a layer drawn near the surface. An example of this is an MFI zeolite layer which has a columnar habit at the base of the layer and a rectangular habit at the surface of the layer. Many MFI zeolite layers grown in accordance with the present invention exhibit only one habit throughout the thickness of the zeolite layer. Usually MFI zeolite layers with a preferred C-axis orientation exhibit a columnar habit (or morphology) throughout the entire thickenss of the zeolite layer. Often shape preferred orientational layers have a preferred crystallographic orientation.

The dense zeolite layer is formed on either a support or a permeable intermediate layer supported on a support. The support (substrate) can be porous or non-porous. If the support is porous, it will be porous material throughout its entire thickness. Preferably, an inorganic oxide or stainless steel will be utilized. The porous substrate, hence can be ceramic, metal, carbide, polymer, or mixtures thereof. For example, refracting oxides, such as alumina, titania, silica, as well as materials such as cordierite, mullite, stainless steel, pyrex, zeolite, silica, silicon carbide, carbon, graphite, and silicon nitride or mixture thereof can be utilized. The substrate hence can have a uniform pore size throughout or may be asymmetrical, having a larger pore structure throughout the bulk of the substrate with a smaller pore structure at the surface. The substrate pore size is dictated by mass transfer considerations. It is preferred that the pore structure and thickness of the substrate be chosen such that mass transfer resistance does not limit the flux of material permeating throughout the membrane during use. The substrate will hence display a porosity of about 5 to 70%, preferably about 20 to 50% and an average pore size of about 0.004 to about 100 microns, preferably about 0.05 to 5 microns.

Additionally, non-porous supports will include quartz, silicon, glass, borosilicate glasses, dense ceramics, i.e., clays, metals, polymers, graphite and mixtures thereof. When non-porous supports are utilized, the compositions are useful as sensors. Most preferably, the support will be a porous ceramic or a porous metal.

It is preferred that the surface of the substrate, porous or non-porous, on which the zeolite layer is grown be smooth. Roughness in the substrate leads to defects in the zeolite layer. The substrate should have an average roughness with an amplitude of less than 10 μm with an aspect ratio of the roughness less than 1:1. It is preferable that the average roughness of the substrate be less than 0.5 μm with an aspect ratio of the roughness less than 1:1. Though non-porous substrates may be utilized, porous substrates are preferred.

If a permeable intermediate layer is present, it may be mesoporous or microporous. Microporous and mesoporous intermediate layers can contain zeolites. Mesoporous intermediate layers can contain inorganic oxides, metals or carbides. Zeolites in the permeable intermediate layer can be used to nucleate the growth of the zeolite layer. When the intermediate layer nucleates the growth of the zeolite layer in a hydrothermal synthesis process, the morphology of crystals in the zeolite layer can be columnar platelike or mixtures of the two and a crystallographically preferred orientation may be observed. When the intermediate layer is mesoporous and contains nanocrystalline zeolites, it is referred to as a growth enhancing layer (GEL). When the intermeditate layer is microporous and contains nanocrystalline zeolites it is referred to as a Seeding layer. A growth enhancing layer (GEL) contains identifiable particles with interstices between said particles of colloidal zeolites; or colloidal zeolites and metal oxides; colloidal zeolites and colloidal metal; and mixtures thereof. The oxides which can be used herein are selected from the group consisting of colloidal alumina, colloidal silica, colloidal zirconia, colloidal titania and polymeric metal oxides prepared from sol-gel processing and mixtures thereof Preferably colloidal alumina will be used. The colloidal metals which can be used include copper, platinum, and silver. Said interstices in the GEL are mesoporous. In a preferred embodiment, said mesoporous interstices in the GEL have sizes of about 20 to about 2000 Å. Interstices in this size range provide a permeation path for molecules through the GEL layer. Molecules can permeate through these interstices because they are devoid of any material which would hinder mass transport during the compositions use. GEL and Seeding layers nucleate the formation of the dense mat of zeolite crystals grown on the surfaces of these layers. This dense mat of crystals is closely packed together such that 99% of the grain boundary zones stretching between top and bottom of the zeolite layer have at least one point along their length where the width does not exceed 20 Å. As the zeolite layer grows from the interface at the GEL layer, crystal width may increase, however the individual crystals remain separated at their boundaries by a distance between adjacent crystals of $\leq 20$ Å. This densely packed mat can have a columnar morphology. Zeolite membranes grown without the use of seeding or growth enhancing layers do not have the degree of perfection of such columnar compositions.

Both seeding and GEL layers contain nanocrystalline zeolites. Growth enhancing layers can be formed from a solution containing a nanocrystalline zeolite; a mixture of metal oxide and nanocrystalline zeolite; a mixture of colloidal zeolite and colloidal metal; or mixtures thereof. Preferably, colloidal zeolite or a mixture of colloidal zeolite and metal oxide will be used to form the GEL layer. Seeding layers are formed from solutions containing nanocrystalline zeolites. Nanocrystalline zeolites have sizes between 50 and 5,000 Å and form a stable dispersion or solution of discrete particles. In that process, a synthesis mixture is prepared by boiling an aqueous solution of a silica source and an organic structure directing agent in a proportion sufficient to cause substantially complete dissolution of the silica source. The silica source is advantageously particulate silica or polymeric silica which is prepared by methods known in the art; see for example Brinker and Scherer, Sol-Gel Science, Academic Press, 1990. A preferred method for preparing polymeric silica is by the acid hydrolysis of tetraethylorthosilicate and a preferred method for preparing colloidal silica is by the base hydrolysis of tetraethylorthosilicate. The organic structure directing agent, if used, is advantageously introduced into the synthesis mixture in the form of a base, specifically in the form of a hydroxide, or in the form of a salt, e.g., a halide, especially a bromide. The structure directing agent may be, for example, the hydroxide or salt of tetramethylammonium (TMA), tetraethylammonium (TEA), triethylmethylammonium (TEMA), tetrapropylammonium (TPA), tetrabutylammonium (TBA), tetrabutylphosphonium (TBP), trimethylbenzylammonium (TMBA), trimethylcetylammonium (TMCA), trimethylneopentylammonium (TNNA), triphenylbenzylphosphonium (TPBP), bispyrrolidinium (BP), ethylpyridinium (EP), diethylpiperidinium (DEPP) or a substituted azoniabicyclooctane, e.g. methyl or ethyl substituted quinuclidine or 1,4-diazoniabicyclo-(2,2,2)octane. Preferred structure-directing agents are the hydroxides and halides of TMA, TEA, TPA and TBA, and mixtures of hydroxides and halides thereof.

Either GEL or seeding layers can be formed from solutions containing the colloidal zeolites. Composition of the solutions and processing conditions determine if a GEL or seeding layer is obtained. For the GEL layer, it is preferable to calcine it at temperatures $\leq 1000°$ C., preferably from about 300–600° C. When a GEL layer is formed, it is maintained in the final composition as a distinct layer having a thickness of about 0.1 to 20 μm, preferably about 1 to 5 μm. This layer contains interstices as described above.

By adjusting the ratio of colloidal zeolite and metal oxide, the density of nucleation sites on the GEL can be controlled. This density controls the morphology of the zeolite layer grown over the growth enhancing layer in a subsequent hydrothermal synthesis step. The higher the nucleation density, the narrower the zeolite-crystal width the layer will exhibit at the GEL zeolite interface. Nucleation density can be controlled by the relative proportions of nanocrystalline zeolites and metal oxides (with the density decreasing as the amount of the metal oxide utilized increases) as well as the size of the nanocrystalline zeolites in the GEL. Nanocrystalline sized zeolites in the range of from 50–10,000 Å are thus used in the GEL. The larger the nanocrystalline zeolite crystals utilized in the GEL, the wider the zeolite columns in the membrane will be. Applicants believe that the addition of metal oxide, colloidal metal or mixtures thereof to the colloidal zeolite in the GEL layer provides spaces between nucleation sites allowing for control of the crystal width in the zeolite layer.

GEL's containing pure metal oxides or colloidal metal fail to produce nucleation sites. A preferred formulation of GEL contains 100-x wt % of colloidal metal or metal oxide and x wt % of colloidal zeolite, where x is at least 0.01 when the GEL is not formed from pure colloidal zeolite. Hence, the nucleation density is set by the above formula as well as the size of the particles of colloidal zeolite, colloidal metal and metal oxide. The smaller the particle size of the colloidal zeolite particles, the denser the nucleation sites which produces narrower zeolite crystal widths.

The hydrothermal treatment to form the crystalline zeolite layer is advantageously carried out by contacting the GEL or seed layer with a zeolite synthesis mixture, and heating for a time and at the temperature sufficient to effect crystallization. Contacting as used herein includes total and partial immersion. Heating times may be, for example, in the range of from 1 hour to 10 days, preferably from 24 hours to 4 days. Temperatures may be, for example, from 50 to 300° C., preferably from 150 to 200° C. Contacting of the substrate with GEL or seed layer must be carried out such that there is no settling of crystals formed in the synthesis mixture during hydrothermal treatment onto the GEL or seed layer. When a true zeolite material is formed, the synthesis mixture contains a source of silica; optimally a structure directing agent, and a source of any other component desired in the resulting zeolite. It may also contain nanocrystalline zeolites or seed crystals. Synthesis mixtures from which zeolite crystals are grown are well known in the art (see e.g., *Handbook of Molecular Sieves*, Rosemarie Szostak, Van Nostrand Reinhold, N.Y. 1992). A preferred route for MFI zeolites, e.g., is from a Low Alkaline synthesis mixture having a pH of about 6 to about 13 preferably about 8 to about 13, and from which MFI zeolite crystals can be grown. Such mixtures are readily prepared by those skilled in the art. For example, suitable mixtures include $Na_2O$, TPABr, tetrapropylarmnoniumbromide, $SiO_2$ and water. The compositions are grown by contacting the GEL coated substrate of choice in the low alkaline synthesis mixture. The synthesis mixture is then heated to about 50 to about 300° C., preferably about 180° C. for a period of about 30 minutes to about 300 hours, preferably for about 30 minutes. After crystallization, the supported layer may be washed, dried, and calcined by methods known in the art.

A preferred synthesis technique used with this invention is the growth of zeolite crystals on the face of a support or intermediate layer which is oriented from 90 to 270 degrees in a synthesis mixture. In the 180 degree orientation, the preferred orientation, the surface on which the zeolite layer is to be grown is horizontal and facing downward, thus being referred to as inverted. Applicants believe this prevents zeolites which are homogeneously nucleated in the synthesis mixture from settling by gravitation and incorporating into the growing zeolite layer. Thus, the zeolite layer is not perturbed during the growth process. This synthesis technique is referred to as an Inverted In-Situ-Crystallization (I-ISC) process. Growth on a GEL from a Low-Alkaline-synthesis solution using the I-ISC process is referred to as a GEL-LAI-ISC process or composition. Growth using a Seeding Layer from a Low-Alkaline-synthesis solution using the I-ISC process is referred to as a S-LAI-ISC process or composition. For I-ISC, GEL-LAI-ISC and S-LAI-ISC processes, the crystal width in the zeolite layer is between 0.1 and 20 $\mu$m. It has been found that when MFI layers are grown by the LAI-ISC process, a degree of crystallographic orientation occurs. Much more significant crystallographic orientation occurs when MFI layers are grown by the GEL-LAI-ISC process or the S-LAI-ISC process. Preferred orientation will be different depending on the zeolite grown, however, a preferred orientation can be exhibited. When MFI zeolite layers are grown using a I-ISC process from a Low Alkaline synthesis solution, the crystallographic orientation of the MFI zeolites is such that at least 75% of the crystals in the zeolite layer are aligned in the orientation (with the c-axis parallel to the growth direction within 15° preferably 5° of the normal to the surface of the zeolite layer), preferably at least 90% of the crystals will display the preferred orientation. A measure of the proportion of the crystals that have the longest axis normal to the plane of the layer may be obtained by comparison of the X-ray diffraction pattern of the layer with that of a randomly oriented zeolite powder. In the case of an MFI-type zeolite, for example, the longest edge corresponding to the c axis, the ratio of the intensity of the 002-peak to the combined 200 and 020 peak is divided by the same ratio for randomly oriented powder; the quotient is termed the crystallographic preferred orientation (CPO). Measured in this way, layers in accordance with the invention have a CPO of at least 2, and may have a CPO higher than $10^5$.

Zeolite compositions fabricated using the above described LAI-ISC, GEL-LAI-ISC, or S-LAI-ISC techniques can have dense zeolite layers in which the zeolite crystals are intergrown such that non-selective permeation pathways in these as-synthesized zeolite layers are non-existent. Absence of these non-selective pathways can be established using the previously described Dye Test.

In this state, it would be expected that these continuous layers of intergrown zeolite crystals would effect selective separations of molecules. An example of an expected selective separation is through molecular sieving mechanisms. Such separations are realized when specific molecules are sterically unrestricted by the zeolite pores (becoming permeate molecules) while larger molecules (retentate molecules) are rejected because of steric constraints. Thus the effective zeolite pore diameter becomes the controlling aperture of the selective permeation pathway. An example of such separations effected through molecular sieving would be the separation of para-xylene from a mixture of xylenes isomers utilizing an MFI-based zeolite composition. The controlling pore aperture for the selective permeation pathway in the MFI system is larger than the kinetic diameter of para-xylene and smaller than the kinetic diameters of ortho-xylene and meta-xylene.

Contrary to expectations, the previously described zeolite compositions produced using LAI-ISC, GEL-LAI-ISC, or S-LAI-ISC techniques, and having dense, intergrown, continuous zeolite layers, exhibit a separation with selectivities less than expected. This is very evident when the compositions with dense, intergrown, continuous zeolite layers are tested in molecular sieving. Generally, expected separation performance can be estimated from independent measurements of the diffusivity of molecular species in the zeolites and the partition coefficient for molecules entering the zeolite form a molecular mixture being processed. Techniques to measure these quantities have been described J. Karger and D. Ruthven in "Diffusion In Zeolites And Other Microporous Solids" (John Wiley And Sons Inc. NY, 1992).

Applicants ascribe the less than ideal performance in separations applications for these as-synthesized zeolite compositions to physical changes which occur in the zeolite layer during separations testing or use. These physical changes in the zeolite layer which arises during use may be due to mechanical stresses and deformations which occur because of exposure of the zeolite layer to elevated temperatures and pressures in the presence of hydrocarbon molecules. Applicants believe that stress or mechanical deformations in a layer of closely packed zeolite crystals may introduce defects or voids in the layer which can degrade the permselective properties of the layer. Specifically the deformation or movement of one crystal will affect the neighboring crystals as well as the grain boundary separating the crystals.

Although, most of these dense intergrown zeolite layers completely reject dye (using the Dye Test procedures described above) prior to testing (indicating continuous zeolite layers), they then exhibit less than expected performance characteristics during use for high temperature molecular separations, and finally fail the dye test in post-testing evaluations by passing dye through the zeolite layer. Dense intergrown zeolite layers which do not reject dye in testing prior to testing in separations typically have a small number of isolated defects.

In order for coatings to be effective, they must be applied directly to the as-synthesized zeolite layer. The coating can be applied to either surface of the zeolite layer. In a preferred embodiment the coating is applied to the surface of the zeolite layer which is not in contact with the support or intermediate layer. Additionally, these coatings must interact with the zeolite layer without blocking or impeding molecular transport through pore openings of the zeolite layer. Interaction of the coating with the zeolite layer should be such that the coating does not block transport through more than nine-tenths of the surface-exposed pore openings of the zeolite layer. In a preferred embodiment, interaction of the coating with the zeolite layer should be such that the coating does not block transport through more than one-half of the surface-exposed pore openings of the zeolite layer. An occlusion does not completely block the diffusion of molecules through the pores, but significantly hinders diffusion of the molecular species of interest through the pore. As such occlusions increase the mass transfer resistance of the composition.

In order to successfully perform as a coating layer with the previously mentioned characteristics, a coating must possess several other properties. First, the coating must be stable at the application temperature of the compositions. Stability is taken to be both mechanical and chemical stability. The coating can change its physical characteristics within the first ~200 hours of use, after which the coating material should be stable. Secondly, the coating must adhere to the zeolite layer and should not impede molecular transport through a significant number of surface-exposed pores of the zeolite layer. This means that the coating layer precursor material must adhere to the zeolite without diffusing significantly into the pore structure of the zeolite crystallites, inhibiting transport of the desired molecular species through the zeolite. For example many polymeric coating materials cannot be used even though they are stable under process conditions because their precursor molecules have molecular sizes which permit their introduction into the zeolite pore system. As such many polymeric coating materials inhibit transport of the desired molecules through the zeolite. It is possible, however, to choose polymeric coating precursor materials which are sterically incapable of entering the pores of the zeolite crystals. An example of such a coating layer precursor is a polyimide resin which can be thermally cured to produce a polyimide coating. Polyimide films have been extensively used in the semiconductor industry and are known to be thermally stable in non-oxidizing atmospheres to temperatures as high as ~500 ° C. Additionally, these polymers have excellent mechanical properties and adhere well to oxide materials. This is especially true when an adhesion promoter is incorporated in the precursor resin. These characteristics indicate that polyimide represents an excellent candidate material for a selectivity enhancing coating.

For the composition to have an adequate flux, the selectivity enhancing coating should increase the mass transfer resistance the composition offers to molecules permeating through the zeolite layer by no more than a factor of five. In a preferred embodiment, the selectivity enhancing coating should increase the mass transfer resistance the composition offers to molecules permeating through the zeolite layer by no more than a factor of two. The coating can increase the mass transfer resistance of the composition offers to molecules permeating through the zeolite crystals by either occluding the zeolite pore structure, or covering the zeolite pore structure. Invariably some portion of the zeolite pore structure exposed on one of the sides of the zeolite layer is covered by the coating. The increase of mass transfer resistance due to the coverage of the zeolite pore structure is determined by the material used to form the selectivity enhancing coating.

The selectivity enhancing coating material can be a permeable or impermeable material, or a material which in some regions is permeable and in other regions impermeable. The permeability of the coating is taken to mean its ability to pass the molecules transported through the zeolite layer at the temperature of composition use. Some coating materials are almost impermeable at low temperatures and become permeable at high temperatures. An example of a polymeric coating material which has a temperature dependent permeability is polyimide. At room temperature, polyimide films with thicknesses greater than 0.5 $\mu$m have a very low permeability too hydrocarbon molecules containing between 5 and 15 carbon atoms. At elevated temperatures (between 100° C. and 500° C.) these hydrocarbon molecules can permeate through the free volume left in dense polyimide films. As such, polyimide films meet the requirements for a permeable selectivity enhancing coating.

If the selectivity enhancing coating is made from a permeable material, the material can be coated over the entire surface of the zeolite layer. Permeable materials can either have a pore structure which transports molecules that can pass through the zeolite or it can be a dense material which has a free volume sufficient to permeate molecules which can pass through the zeolite. Examples of permeable inorganic materials containing a pore structure are materials produced by sol-gel processing. Examples of a dense material which has a free volume sufficient to permeate molecules which can pass through the zeolite are polymers. A preferred polymeric material used for the selectivity enhancing coating is polyimide. Preferably the selectivity enhancing material is formed into a film which has well mechanical properties sufficient to stabilize the zeolite layer during use.

If the material used for the selectivity enhancing coating is made from an impermeable material, it cannot completely cover and block the pore structure of the zeolite membrane. Impermeable materials must be applied so that they cover only a fraction of the zeolite layer. Ideally an impermeable coating must bridge the boundaries of enough zeolite crystals to prevent defects and voids from arising without blocking a significant fraction of the zeolite composition. Preferably, this type of selectivity enhancing coating bridges boundaries between at least 10% of the surface-exposed crystals in the zeolite layer and, more preferably, the coating bridges he boundaries between at least 50% of the surface-exposed crystals in the zeolite layer.

A third type of selectivity enhancing coating may combine the characteristics of the two previously described coating systems. It may be both permeable (to process molecules) in some regions of the layer and impermeable in other regions of the composition. An example of such a coating is a thin silica film which when deposited on the surface of a zeolite nucleates and grows a porous film in some areas and a dense film in others. Applicants believe that such silica films can be deposited by interfacial ozone assisted CVD processes. In the bulk phase, silica is a dense impermeable material for the permeation of hydrocarbon molecules, however when deposited as a thin film, some regions of the film can be formed into pores or isolated molecular or nanoscale aggregates of the coating material on the surface of the zeolite layer. In the region of the zeolite layer covered by either pores in the silica film or isolated molecular or nanoscale aggregates of the silica coating material, the coating is said to be porous. The porous region may occur at the edge of a dense region in the film.

The selectivity enhancing coating can serve two functions. First, it can attenuate the flow through defects in a composition, thereby providing a reparation of existing defects. Secondly, it can prevent the formation of defects during use. The second of these functions is especially important and is referred to as stabilization of the composition. Defects which are observed to form during use are crack structures in the zeolite layer which degrade the performance of the composition. In many cases, these cracks extend into the growth enhancing layer. Cracks in the zeoliter layer provide a very permeable nonselective pathway that reduces the overall selectivity of the composition. Isolated crack structures may form or grow by temperature cycling, or by cycling the trans-composition pressure, or by cycling the total system pressure, or by introducing a liquid phase feed onto the composition. Crack structures grow by either branching or by extending their length. As crack structures grow they form an intergrown crack network in the zeolite layer. The selectivity enhancing coating prevents these cracks and crack networks from forming. As such, the selectivity enhancing coating stabilizes the composition, preventing defect structures (i.e. cracks) which were not in the as synthesized composition forming during use or changing of the physical conditions. By preventing defect structures from forming, the selecitivity enhancing coating improves the separation properties of the zeolite composition.

All selectivity enhancing coating materials must be able to improve the separation properties of the zeolite layer of the composition. Separation properties are measured as the ability of a composition to pass one molecular species through the zeolite layer while impeding the transport of at least one other molecular species. Because flux through zeolite layers tends to increase with temperature, it is preferred to conduct these separations at elevated temperatures above room temperature, preferable above 100° C. For hydrocarbon molecules other than methane and ethane, it is preferred to conduct these separations at temperatures less than 600° C. to avoid thermal degradation of the hydrocarbons.

The compositions with selectivity enhancing coatings are useful for a variety of separations. The compositions are useful for separation processes whereby feedstock derived from petroleum, natural gas, hydrocarbons, or air comprising at least two molecular species is contacted with the composition comprising a substrate, a zeolite or zeolite-like layer, a selectivity enhancing coating in contact with the zeolite layer, and optionally a permeable intermediate layer in contact with the substrate, the zeolite layer or zeolite-like layer being in contact with the substrate or the optional intermediate layer, wherein at least one molecular species of said feedstock is separated from said feedstock by said composition and wherein said hydrocarbon feedstocks are coal, bitumen and kerogen derived feedstocks. Separations which may be carried out using a composition comprising a zeolite layer in accordance with the invention include, for example, separation of normal alkanes from co-boiling hydrocarbons, especially n-$C_{10}$ to $C_{16}$ alkanes from kerosene; also normal alkanes and alkenes from the corresponding branched alkane and alkene isomers; also alcohols from other hydrocarbons, particularly alkanes and alkenes that may be present in mixtures formed during the manufacture of the alcohols; separation of aromatic compounds from one another, especially separation of $C_8$ aromatic isomers from each other, more especially para-xylene from a mixture of xylenes and, optionally, ethylbenzene, and separation of aromatics of different carbon numbers, for example, mixtures of benzene, toluene, and mixed $C_8$ aromatics; separation of aromatic compounds from aliphatic compounds, especially aromatic molecules with from 6 to 8 carbon atoms from $C_5$ to $C_{10}$ (naphtha range) aliphatics; separation of olefinic compounds from saturated compounds, especially light alkenes from alkane/alkene mixtures, more especially ethene from ethane and propene from propane; removing hydrogen from hydrogen-containing streams, especially from light refinery and petrochemical gas streams, more especially from $C_2$ and lighter components; and alcohols from aqueous streams.

Specifically, the following table shows some possible feedstocks derived from petroleum, natural gas or air and the molecular species separated therefrom by use of the instant compositions. The table is not meant to be limiting.

| Feedstock | Separated Molecular Species |
| --- | --- |
| Mixed xylenes (ortho, para, meta) and ethylbenzene | Paraxylene |
| Mixture of hydrogen, $H_2S$, and ammonia | Hydrogen |
| Mixture of normal and isobutanes | Normal butane |
| Mixture of normal and isobutenes | Normal butene |
| Kerosene containing $C_9$ to $C_{18}$ normal paraffins | $C_9$ to $C_{18}$ normal paraffins |
| Mixture of nitrogen and oxygen | Nitrogen (or oxygen) |
| Mixture of hydrogen and methane | Hydrogen |
| Mixture of hydrogen, ethane, and ethylene | Hydrogen and/or ethylene |
| Coker naphtha containing $C_5$ to $C_{10}$ normal olefins and paraffins | $C_5$ to $C_{10}$ normal olefins and paraffins |
| Methane and ethane mixtures containing argon, helium, neon, or nitrogen | Helium, neon, and/or argon |
| Intermediate reactor catalytic reformer products containing hydrogen and/or light gases | Hydrogen, and/or light gases ($C_1$–$C_7$) |
| Fluid Catalytic Cracking products containing $H_2$ and/or light gases | Hydrogen, and/or light gases |
| Naphtha containing $C_5$ to $C_{10}$ normal paraffins | $C_5$ to $C_{10}$ normal paraffins |
| Light coker gas oil containing $C_9$ to $C_{18}$ normal olefins and paraffins | $C_9$ to $C_{18}$ normal olefins and paraffins |
| Mixture of normal and isopentanes | Normal pentane |
| Mixture of normal and isopentenes | Normal pentene |

-continued

| Feedstock | Separated Molecular Species |
|---|---|
| Mixture of ammonia, hydrogen, and nitrogen | Hydrogen and nitrogen |
| Mixture of A10(10 carbon) aromatics | e.g. Paragiethylbenzene (PDEB) |
| Mixed butenes | n-butenes |
| Sulfur and/or nitrogen compounds | $H_2S$ and/or $NH_3$ |
| Mixtures containing Benzene (Toluene) | Benzene |
| $H_2$, propane and propylene | Hydrogen and/or propylene |

Applicants believe that molecular diffusion is responsible for the above separations. Additionally, the compositions can be used to effect a chemical reaction to yield at least one reaction product by contacting the feedstocks as described above or below with the compositions having a catalyst incorporated within the zeolite layer, support, or intermediate layer or by placing the catalyst in close enough proximity with the composition to form a module. A module would react the feedstock just prior to its entrance into the composition or just after its exit from the composition. In this manner one can separate at least one reaction product or reactant from the feedstocks. The catalysts of choice for particular process fluids are well known to those skilled in the art and are readily incorporated into the instant compositions or formed into modules by one skilled in the art. The following table represents some of the possible feedstocks/processes, in addition to those above which can be reacted and some possible products yielded. The table is not meant to be limiting.

| Feedstock/process | Product Yielded |
|---|---|
| Mixed xylenes (para, ortho, meta) and ethylbenzene | Paraxylene and/or ethylbenzene |
| Ethane dehydrogenation to ethylene | Hydrogen and/or ethylene |
| Ethylbenzene dehydrogenation to styrene | Hydrogen |
| Butanes dehydrogenation butenes (iso's and normals) | Hydrogen |
| Propane dehydrogenation to propylene | Hydrogen and/or propylene |
| $C_{10}$–$C_{18}$ normal paraffin dehydrogenation to olefins | Hydrogen |
| Hydrogen Sulfide decomposition | Hydrogen |
| Reforming dehydrogenation/aromatization | Hydrogen, light hydrocarbons $C_1$–$C_7$) |
| Light Petroleum Gas dehydrogenation/aromatization | Hydrogen |
| Mixed Butenes | n-butenes |

The supported zeolite layer of the invention may be employed as a membrane in such separations without the problem of being damaged by contact with the materials to be separated. Furthermore, many of these separations are carried out at elevated temperatures, as high as 500° C., and it is an advantage of the supported layer of the present invention that it may be used at such elevated temperatures.

The present invention accordingly also provides a process for the separation of a fluid mixture which comprises contacting the mixture with one face of a zeolite layer according to the invention under conditions such that at least one component of the mixture has a different steady state permeability through the layer from that of another component and recovering a component of mixture of components from the other face of the layer.

The invention further provides a process for catalyzing a chemical reaction which comprises contacting a feedstock with a zeolite layer according to the invention which is in active catalytic form under catalytic conversion conditions and recovering a composition comprising at least one conversion product.

The invention further provides a process for catalyzing a chemical reaction which comprises contacting a feedstock with one face of a zeolite layer according to the invention, in active catalytic form, under catalytic conversion conditions, and recovering from an opposite face of the layer at least one conversion product, advantageously in a concentration differing from its equilibrium concentration in the reaction mixture. For example, a para-xylene rich mixture from the reactor or reactor product in a xylenes isomerization process; aromatic compounds from aliphatics and hydrogen in a reforming reactor; hydrogen removal from refinery and chemicals processes such as alkane dehydrogenation in the formation of alkenes, light alkane/alkene dehydrocyclisation in the formation of aromatics (e.g., Cyclar), ethylbenzene dehydrogenation to styrene.

The invention further provides a process for catalyzing a chemical reaction which comprises contacting one reactant of a bimolecular reaction with one face of a zeolite layer according to the invention, in active catalytic form, under catalytic conversion conditions, and controlling the addition of a second reactant by diffusion from the opposite face of the layer in order to more precisely control reaction conditions. Examples include: controlling ethylene, propylene or hydrogen addition to benzene in the formation of ethylbenzene, cumene or cyclohexane respectively.

The invention further contemplates separation of a feedstock as described herein wherein the separated species reacts as it leaves the zeolite layer or as it passes through the membrane and thus for another product. This is believed to increase the driving force for diffusion through the zeolite layer.

Catalytic functions can be incorporated into the compositions. When a catalytic function is incorporated into the compositions, it can be used as an active element in a reactor. Several different reactor architecture's can be constructed depending on the location of the catalytic site in the composition. In one case the catalytic function can be located within the zeolite layer, while in another case the catalytic function can be located within the support, and in another case the catalytic function can be distributed throughout the support, GEL layer or seed layer and the zeolite layer. Impregnating with catalytically active metals such as Pt can impart the catalytic function to the composition. In addition, catalytic function can be incorporated into a membrane reactor by locating conventional catalyst particles near one or more surfaces of the composition such that specific reaction products or reactants are continuously and selectively removed or added to the reaction zone throughout the reactor.

EXAMPLE 1
Xylene Separation Using MFI Compositions Synthesized With The LAI-ISC Process Several different MFI compositions were prepared and tested for the separation of xylene isomers. The tests were conducted on as synthesized membranes which did not have a selectivity stabilizing coating. The materials used for synthesis of LAI-ISC compositions will first be described, followed by the hydrothermal synthesis conditions used, followed by a description of the products made and then by a summary of results from dye testing before and after xylene separation experiments which exhibited low selectivities. The results of the xylene separation experiments showed selectivities which were less than expected. For the range of conditions under which the xylenes testing experiments were conducted, the selectivities for the separation of para from either the metal or ortho isomer were expected to be greater than 2.5 over the entire range temperatures used. This lower limit for the expected selectivity was determined from measurements of diffusion coefficients of the xylene isomers in the type of high silica MFI crystals present in the membrane.

1. Materials

The hydrothermal experiments were performed using mixtures of the following reagents: NaOH(Baker), $Al(NO_3)_3 \cdot 9H_2O$(Baker), Ludox AS-40 (Dupont), tetrapropylammonium bromide (98% Aldrich), and distilled water.

Porous alumina and stainless steel substrates were used for the support of the zeolite layers. The alumina substrates alpha phase and has an average pore size and porosity of about 800Å and 32%., respectively. Porous sintered stainless steel substrates from Mott (0.25 $\mu$m) and Pall (M020, 2 $\mu$m) were obtained. All of the substrates were cleaned with acetone in an ultra-sonic bath, dried at 120° C. and then cooled down to room temperature before use.

2. Hydrothermal Reaction

MFI compositions were prepared from two different reaction batch mixtures, one contained silica only to make silicalite and the other was doped with alumina to make ZSM-5. They have the general formulation x $M_2O$: 10 $SiO_2$: (0–0.045) $Al_2O_3$: 0.5 TPA Br: y$H_2O$; where M can be Li, Na, K, Rb, and Cs, x varied from 0 to 0.5, and y varied from 50 to 3000. TPABr may be replaced with tetrapropylammonium hydroxide if desired. All the results shown in the next section have the composition of 0.22 $Na_2O$: 10 $SiO_2$: 280 $H_2O$: 0.5 TPA Br and doping with 0.05 $Al_2O_3$ for the ZSM-5 sample. The 1.74 g of TPA Br and 0.45g of NaOH (50 wt %) were dissolved in 52 ml of distilled water with stirring. To this solution, 18.8 g of Ludox AS-40 was then added with agitation for at least 15 minutes until a uniform solution was formed.

The substrates were placed inverted in a Teflon lined reaction vessel supported on a stainless steel wire frame. The distance between the substrate and the bottom of reactor was at least 5 mm. The synthesis solution was then poured into the reactor to cover the whole substrate. The autoclave was sealed and placed in an oven which was preheated at the desired temperature. The reaction bombs were removed from the oven after reaction and cooled to room temperature. The coated substrates were washed with hot water for at least 6 hours, then calcined at 500° C. for 6 hours in air. The heating rate was controlled at 10° C./hour.

3. Products

The following table shows some typical examples synthesized under different experimental conditions, such as reaction time, and substrate.

4. Physical Characterization Of Compositions

Figure 2:
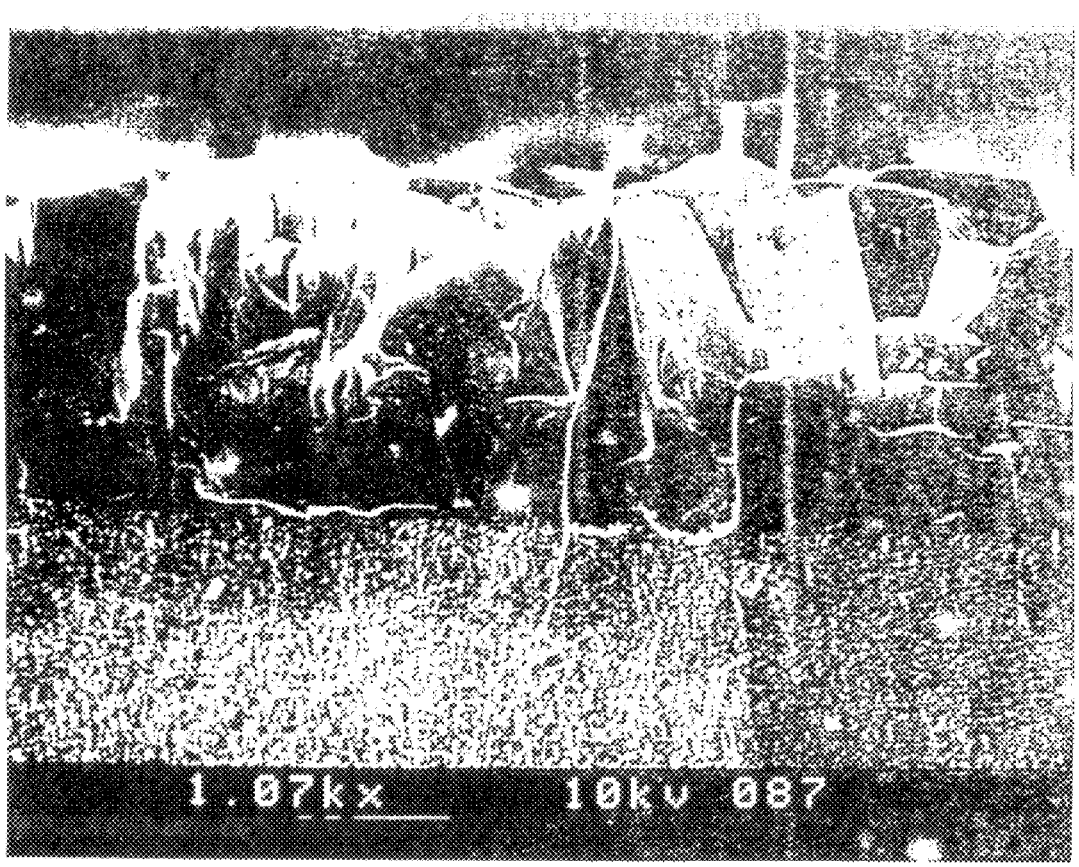
FIG. 2 shows a scanning electron micrograph of the morphology of an MFI zeolite composition formed by the LAI-ISC Process. The porous substrate that is formed from a-alumina with 800 Å pores is seen in the bottom third of the figure. The dense intergrown layer of MFI zeolite crystals is visible in the upper portion of the figure.
Figure 3:
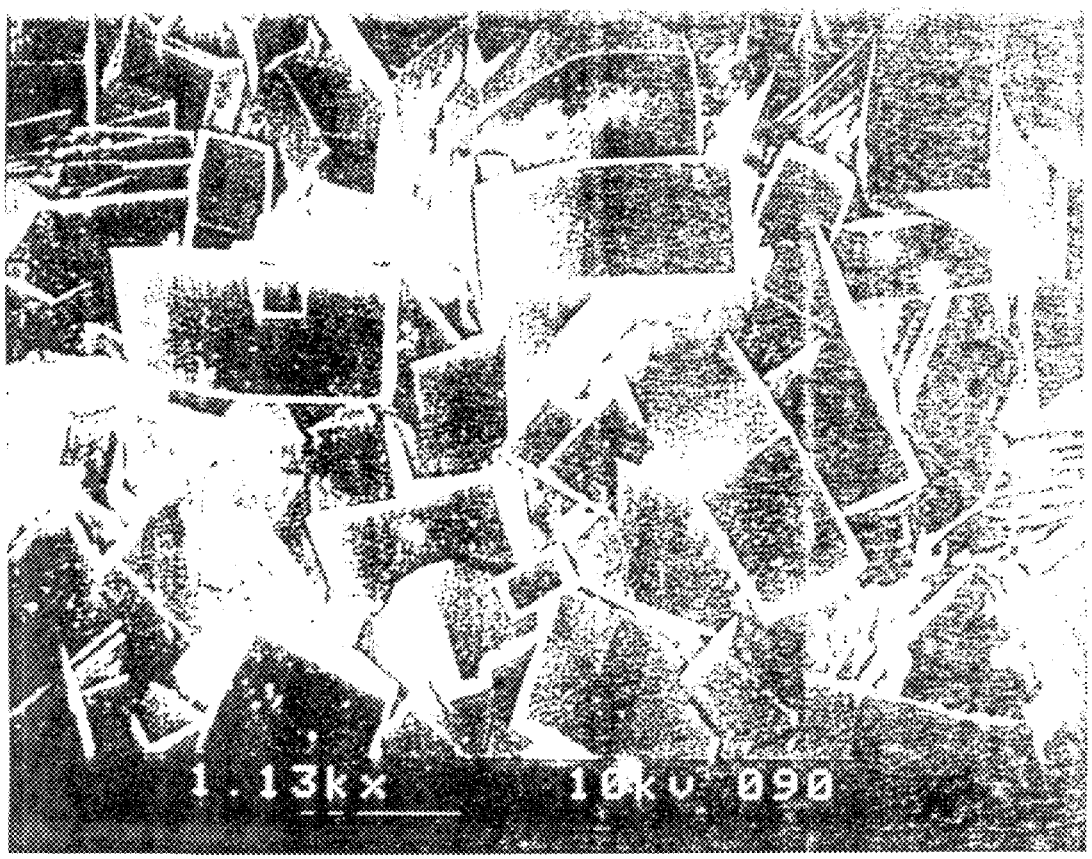
FIG. 3 shows a scanning electron micrograph of the exterior surface of a GEL-LAI-ISC MFI zeolite composition. The surface shown is an intergrown dense mat of zeolite crystals which are substantially free of defects extending through the thickness of the layer.

The resulting compositions were characterized by x-ray diffraction and electron microscopy. X-ray diffraction revealed that the zeolite grown was MFI with no other phases detected. The x-ray diffraction analysis also revealed a degree of preferred orientation in the as-synthesized membrane. To establish that the zeolite layer was substantially free of voids, membranes were cleaved and the cross-sectional profile of the zeolite layer was viewed in the scanning electron microscope. FIG. 2 shows a cross sectional view of a LAI-ISC composition grown on an alpha-alumina substrate with ~800 Å pores. It is seen that the zeolite layer is continuous and substantially free of voids. FIG. 3 shows a plan view of the surface of a LAI-ISC composition showing that the crystals are intergrown.

5. Dye Testing Procedure Used To Characterize Compositions

The absence of voids in the zeolite layer is reflected in the inability of large dye molecules such as rhodamine B to permeate through the layer into the substrate. Permeation of dye through the zeolite layer can be detected by observing the way it soaks into the porous substrate. Dye permeating through the columnar zeolite layer will be wicked into the porous substrate in a manner similar to the way ink soaks into a piece of blotter paper. The presence of dye in the porous substrate is especially easy to detect when the substrate is made from a porous ceramic that does not absorb light. Light scattering in such porous substrates causes them to appear white when viewed with the naked eye. Any dye which wicks into the substrate through a small pinhole in the zeolite layer will be readily visible as a coloration change in the ceramic substrate. Dye molecules with sizes large than the zeolite pore structure will not transport into the underlying substrate except through defect sites. The rate at which the dye transports through a pinhole is different from the rate at which dye spread over the underlying porous ceramic can be removed through the same pinhole in a subsequent washing step. Thus a simple way of detecting dye permeation into the porous substrate consists of applying a dye solution to the zeolite layer and subsequently washing excess dye away to reveal pinholes in the zeolite layer. The test can be conducted with a soluble dye which has a physical size larger than the controlling aperture size of the zeolite. A preferred dye is Rhodamine B, which is a commonly used laser dye. A convenient solvent to make a solution of this dye is methanol, however other solvents such as toluene can also be used as long as they tend to wet (or wick into) the ceramic substrate. Water is not a recommended solvent for this test. This dye should be applied from a concentrated solution which has a coloration similar to that of commonly available red wines. This range of colorations can be obtained from solutions with Rhodamine B concentrations in the range of 0.05–5 wt %. With different concentrations, the amount of time required for the dye soaking thorough to the substrate to become visible changes. A preferred procedure for dye testing zeolite membranes formed on white porous ceramic substrates is;

1) Make 20 ml of a stock solution containing 0.5 wt % of Rhodamine B in methanol. This solution should be stored in a sealed bottle to prevent evaporation of the methanol.
2) From the stock dye solution remove 5 drops with an eye dropper and apply the dye dropwise to the center of the dry (120° C. for 30 minutes) membrane so that the surface is covered. Typically 2–3 drops are needed to cover the membrane surface. Each drop contains ~0.25 milligrams of dye. Do not let the dye wick over the edge of the membrane into the porous ceramic exposed at the rim of the membrane.

3) Let the dye covered membrane stand for ~30 seconds and then blot off the excess dye solution with a paper towel.
4) Apply methanol to a clean section of the paper towel and blot the surface again with the towel to remove more dye.
5) Rinse the disk surface with methanol for 10–30 seconds. A convenient way to do this is with a methanol wash bottle.
6) Visually examine the substrate for any red colorations 6. Dye Testing Of Compositions Before Separations Testing As-synthesizes LAI-ISC MFI zeolite compositions were dye tested before being used in separations experiments. It was determined that the compositions were essentially free of defects and that dye molecules did not permeate through boundaries between crystals.

7. Xylene Separations Testing

LAI-ISC MFI zeolite composition fabricated on 3 mm thick 1 inch diameter alpha-alumina supports (800 Å pore size) were mounted into a permeation cell and sealed with a graphite o-ring. The membranes chosen for separations testing passed the dye test. The permeation cell was heated to temperatures between 170° C. and 300° C. while a mixture of xylene isomers flowed across the face of the composition which had the zeolite layer. The flow rate of the xylene feed was 1 ml/minute. Across the opposite face of the membrane an argon sweep was flowed at rates between 100 and 400 cc/minute. Pressure of both the argon sweep and the xylene feed was fixed at 1 atmosphere (absolute). Observed selectivities for separation of the xylene isomers by the LAI-ISC compositions was less than 1.75 (para/ortho or para/meta) at all temperatures tested. Typical selectivities were in the range between 1.0 and 1.4. A total of four LAI-ISC compositions were tested in this manner. The LAI-ISC compositions tested had zeolite layer thicknesses in a range between 5 and 25 $\mu$m.

8. Dye Testing Of Compositions After Separations Testing

LAI-ISC MFI zeolite compositions were dye tested after being used in xylene separations experiments. It was determined that compositions pass dye into the substrate. A reddish color not present in the dye test before using in xylene separation experiments was clearly visible in the substrate. This indicated that defects formed during separations testing.

EXAMPLE 2

Xylne Separation By An MFI Composition Synthesized Using A GEL-LAI-ISC Process

Several different MFI compositions were prepared and tested for the separation of xylene isomers. The tests were conducted on as synthesized compositions which did not have a selectivity stabilizing coating. The materials used for the GEL layer will first be described, followed by the technique used to form the GEL layer, followed by the hydrothermal synthesis conditions used, and a description of the final membrane structure. Finally results are presented from dye testing before and after xylene separation experiments which exhibited low selectivities. The results of the xylene separation experiments with these GEL-LAI-ISC compositions showed selectivities which were less than expected. For the range of conditions under which the xylenes testing experiments were conducted, the selectivities for the separation of para from either the meta or ortho isomer should be greater than 2.5 over the entire range of temperatures used. This lower limit for the expected selectivity was determines from measurements of diffusion coefficients of the xylene isomers in the type of high silica MFI crystals present in the compositions.

1. GEL Coating Materials

The following reagents were used in preparing GEL coatings: colloidal alumina solution, colloidal titania prepared from a sol-gel process, colloidal silicalite solutions, and distilled water. Several batches of colloidal silicalite solutions prepared in accordance with the previously described nanocrystalline synthesis method were used for the preparation of GEL coatings. More information on these solutions are shown below:

| Batch # | Silicalite Synthesis Temp. | Silicalite Washed? | Final Silicalite Solution pH | Solids (%) | Particle Size, nm |
|---|---|---|---|---|---|
| 1 | 68 | yes | 10.3 | 8.7 | ~50 |
| 2 | 509 | no | >13 | ~9 | ~50 |
| 3 | 81 | yes | 9.9 | 9.1 | ~90 |
| 4 | 50 | no | >13 | ~9 | ~60 |
| 4 | 50 | yes | ~10 | ~9 | ~60 |

Remarks:
1. All suspensions were prepared from the same type of synthesis solutions with the same raw materials.
2. Batch 4 was a duplication of 2. The solids content of batches 2 and 4 were calculated assuming 55% conversion of amorphous silica to zeolite. The actual solids content of these 2 unwashed samples is of course higher, e.g. for batch 4 the solids content (evaporation to dryness) was 23.3 wt %, but this includes zeolite, amorphous silica and residual TPAOH-NaOH.

Porous alumina and stainless steel substrates were used for the support of GEL and zeolite coatings. The average pore size and porosity of the alumina is about 800 A and 32%, respectively. Porous sintered stainless steel substrates from Mott (0.25 micron) and Pall (M020, 2 micron) were obtained. All the substrates were cleaned with acetone in an ultra-sonic bath, dried at 120° C. and then cooled down to room temperature before use.

2. GEL Coating

In general, a dilute solution is preferred to produce a high quality growth enhancing layer. Dilution with distilled water to obtain a solids concentration less than 1 wt % is generally preferred. Colloidal silicalites and metal oxides are first diluted separately with distilled water to the concentration of 0.5 wt %. The diluted colloidal silicalite solution was slowly added into the desired amount of metal oxide solution with continuous stirring. The resulting solutions with the desired wt % of colloidal silicalite and metal oxide were then degassed for 15 minutes to remove the trapped air in solutions.

The substrates were then spin coated with these solutions at 4000 rpm and calcined at 500° C. for 6 hours in air. The heating rate was controlled at 20° C./hr.

3. Synthesis Of Zeolite Compositions Under Hydrothermal Conditions

The hydrothermal experiments were performed using mixtures of the following reagents: NaOH (Baker), Al(N0$_3$)$_3$•9H$_2$0 (Baker), Ludox AS-40 (Dupont), tetrapropylammonium bromide (98%, Aldrich), and distilled water.

MFI compositions were prepared from two different reaction batch mixtures, one containing silica only to make silicalite and the other doped with alumina to make ZSM-5. They have the general formulation xM$_2$O: 10 SiO2: (0–0.045) Al$_2$O$_3$: 0.5 TPA Br: y H$_2$O; M can be Na, Li, K, Rb, and Cs, x was varied from 0 to 0.5, and y varied from 50 to 3000. All the results shown in the next section have the composition 0.22 Na$_2$O: 10 SiO$_2$: 280 H$_2$O: 0.5 TPABr and doping with 0.05 Al$_2$O$_3$ for the ZSM-5 sample. The 1.74 g of TPABr and 0.45 g of NaOH (50 wt %) were dissolved in 52 ml of distilled water with stirring. To this solution, 18.8 g of Ludox AS-40 was then added with agitation for at least 15 minutes until a uniform solution was formed. TPA Br can be replaced with aqueous tetrapropylammonium hydroxide if desired. Substrates with GEL coating were placed inverted (180° orientation) in a Teflon lined autoclave by supporting them on the stainless steel wire frame. The distance between the substrate and the bottom of autoclave reactor was at least 5 mm. The synthesis solution was then poured into the reactor to cover the whole substrate. The autoclave was sealed and placed in an oven, which was preheated at the desired temperature. The autoclaves were removed from the oven after reaction and cooled to room temperature. The coated substrates were washed with hot water for at least 6 hours, then calcined at 500° C. for 6 hours in air. The heating rate was controlled at 10° C./hour.

4. Products

The following table shows some typical examples synthesized under different experimental conditions, such as GEL composition, reaction time and substrate.

5. General Observations

The x-ray diffraction pattern of typical inverted zeolite composition (LAI-ISC), noninverted zeolite composition (LA-ISC), noninverted zeolite composition grown on a GEL coated substrate (LA-GEL-ISC), and inverted zeolite composition grown on a GEL coated substrate (LAI-GEL-ISC) were observed. Reflections of MFI type zeolite were identified in all diagrams. No zeolite second phase was observed. The only lines in the patterns not associated with the zeolite identified with the porous support. The pattern associated with the GEL-LAI-ISC membrane was dramatically different from other samples. It is seen that the MFI crystal layer prepared from GEL-LAI-ISC exhibits pronounced 001 peaks with no other significant zeolite peaks occurring in the pattern. This is strong evidence that a preferred orientation of (001) directions parallel to the growth direction exists in the membrane. Another way of saying this is that the MFI crystal layer in GEL-LAI-ISC membranes shows very strong orientation with c-axis normal to the GEL layer.

Figure 4:
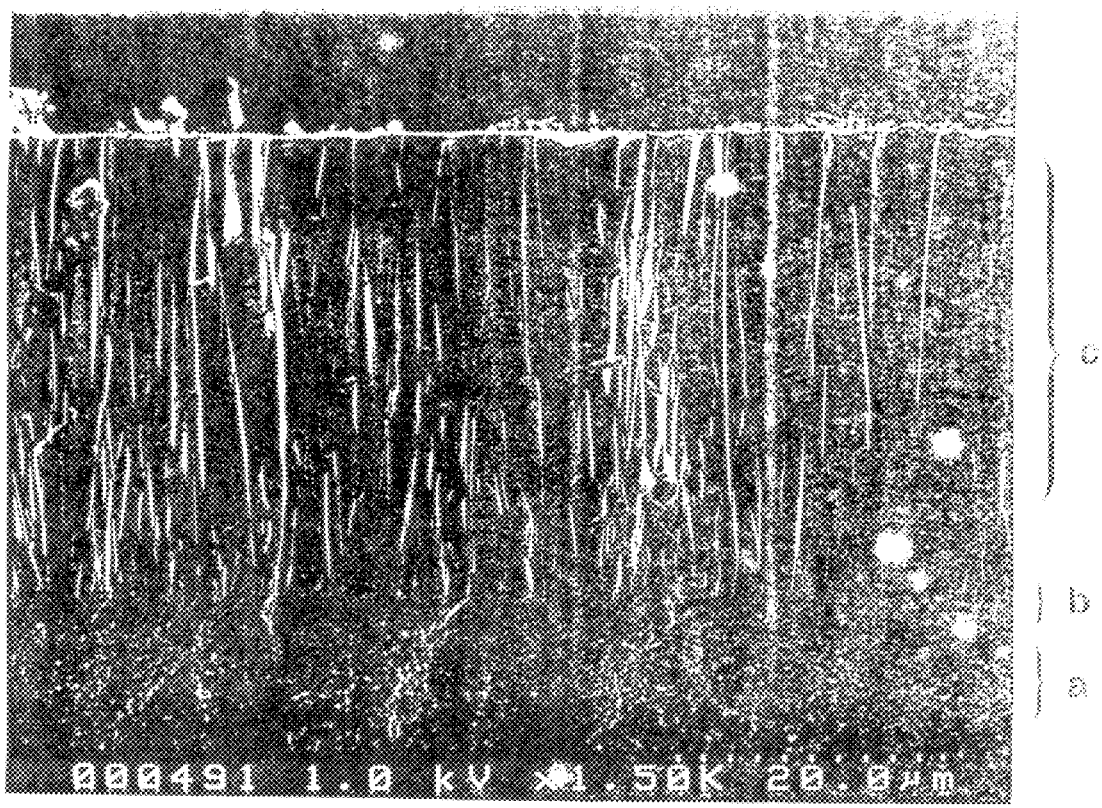
FIG. 4 shows a scanning electron micrograph of the morphology of an MFI zeolite composition containing a Growth Enhancing Layer (GEL, optional permeable layer) that was fractured to reveal a cross section. The layer labeled a) is the porous substrate that is formed from a-alumina with 800 Å pores. The layer labeled b) is the GEL layer which is mesoporous and is clearly discernible in the micrograph. The layer labeled c) contains MFI zeolite crystals which are intergrown together into a dense mat which is free of voids and defects. The columnar nature of zeolite crystals in the layer is readily apparent from the morphology of the fracture surface through the zeolite layer(c).
Figure 5:
FIG. 5 shows a scanning electron micrograph of the exterior surface of a GEL-LAI-ISC MFI zeolite composition. The surface shown in an intergrown dense mat of zeolite crystals which are free of defects extending through the thickness of the layer.
Figure 6:
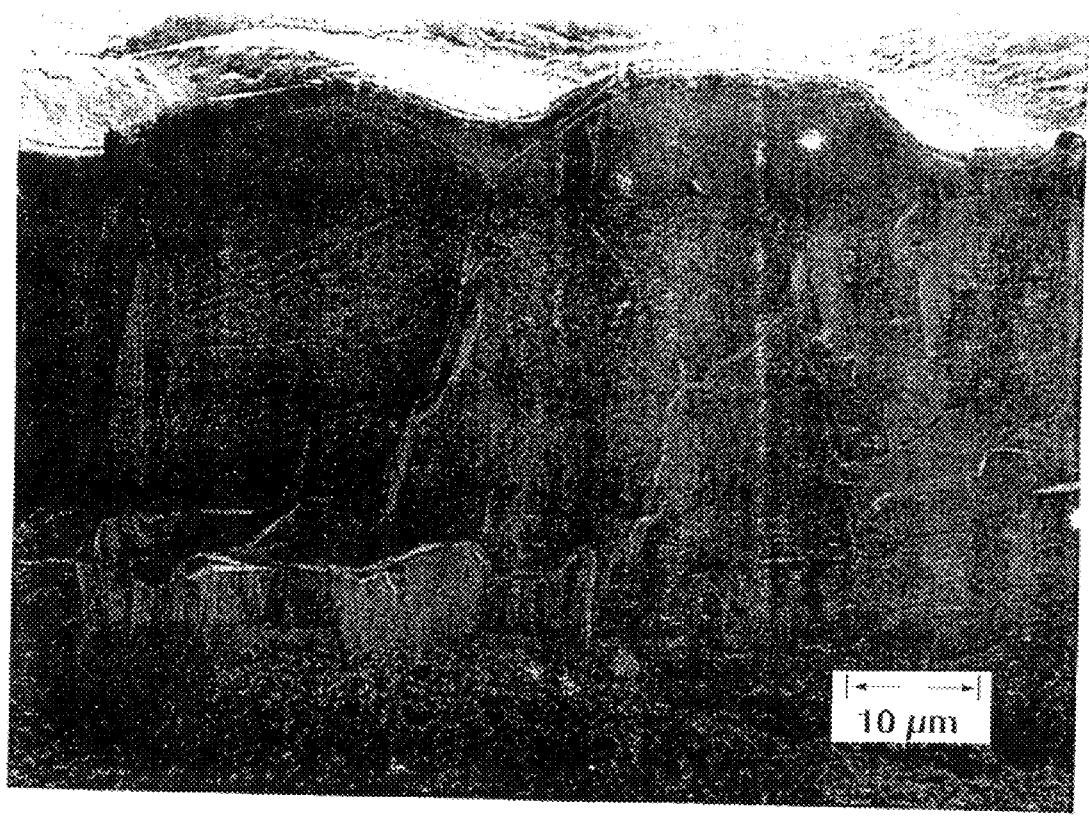
FIG. 6 shows a scanning electron micrograph of the cross-section of a GEL-LAI-ISC MFI with a selectivity enhancing polyimide coating. The coating covers the entire surface of the zeolite layer and is readily visible on top of the zeolite layer.

FIG. 5 shows a plan view of a typical GEL-LAI-ISC membrane (sample #2). The cauliflower-like top surface and columnar cross-sectional morphologies were observed in the membrane. FIG. 4a shows the zeolite layer (C), the growth enhancing layer (B) and porous support (A). The major part of FIG. 4a shows the continuous growth of zeolite that completely covers the surface of the GEL layer. The formation of a columnar structure in the zeolite layer is apparent.

The width of the columns right on the growth enhancing layer is very narrow and becomes larger and larger as the layer grows. As such, the average grain size of zeolite crystals increases with increasing layer thickness. The columnar nature of the microstructure is consistent with the x-ray powder diffraction pattern. The c-axis is the fastest growth for the MFI zeolite in the membrane. In FIG. 5b, it is clear that zeolite surface consists of a continuous array of densely packed zeolite crystals, which are <10 μm in width.

6. Dye Permeation Test Before Xylene Separation Testing

The dye permeation test described in Example 1 was applied to test the integrity of GEL-LAI-ISC compositions grown on porous alpha-alumina supports. It was found that compositions grown with MFI zeolite layers thicker than 5 μm did not permeate dye into the substrate even after they had been calcined. For 1 inch diameter compositions grown on 3 mm thick alpha-alumina supports, even isolated defects were not detected in over ~95% of the membranes tested.

7. Xylene Separations Testing

GEL-LAI-ISC MFI zeolite compositions fabricated on 3 mm thick 1 inch diameter alpha-alumina supports (800 Å pore size) were mounted into a permeation cell and sealed with a graphite o-ring. Xylene separations tests were conducted using the method described in example 1. Observed selectivities for separation of the xylene isomers by the GEL-LAI-ISC membranes was less than 1.75 (para/ortho or para/meta) at all temperatures tested. Typical selectivities were in the range between 1.0 and 1.4. A total of five GEL-LAI-ISC compositions were tested in this manner. The GEL-LAI-ISC compositions tested had zeolite layer thicknesses in a range between 5 and 25 μm.

8. Dye Testing Of Compositions After Separations Testing

GEL-LAI-ISC MFI zeolite compositions were dye tested after being used in xylene separations experiments. It was determined that membranes pass dye into the substrate. A reddish color not present in the dye test before using in xylene separation experiments was clearly visible in the substrate. This indicated that defects formed during separations testing.

TABLE 1

| Sample | @ Substrate | Pore Size μm | Reaction Temp °C. | Reaction Time His | Zeolite Layer Thickness μm | C-axis Result |
|---|---|---|---|---|---|---|
| 1 | alumina | 0.08 | 180 | 4 | 4 | CPO MFI |
| 2 | alumina | 0.08 | 180 | 8 | 12 | CPO MFI |
| 3 | alumina | 0.08 | 180 | 18 | 30 | CPO MFI |
| 4 | SS | 0.25 | 180 | 4 | 4 | CPO MFI |
| 5 | SS | 0.25 | 180 | 8 | 11 | CPO MFI |
| 6 | SS | 0.25 | 180 | 20 | 30 | CPO MFI |
| 7 | alumina | 0.08 | 158 | 64 | 45 | CPO MFI |
| 8 | alumina | 1.0 | 158 | 64 | 45–50 | CPO MFI |
| 9 | SS | 0.25 | 158 | 64 | 50 | CPO MFI |
| 10 | SS | 2.0 | 158 | 64 | 50 | CPO MFI |

@ alumina: 0.08 μm and 1 μm pore size; SS = stainless steel, Pall Corporation, PMM Grade M020 (2 μm) and Mott Corp (0.25)
CPO-Crystallographic Preferred Orientation

TABLE 2

| Sample | @ Substrate | GEL Composition | Reaction Temp °C. | Reaction Time Hrs | Zeolite Layer Thickness μm | C-axis Result |
|---|---|---|---|---|---|---|
| 1 | alumina | a | 165 | 18 | 18 | CPO MFI |
| 2 | alumina | a | 165 | 90 | 81 | CPO MFI |
| 3 | alumina | b | 180 | 18 | 22 | CPO MFI |
| 4 | alumina | c | 180 | 18 | 22 | CPO MFI |
| 5 | alumina | a | 180 | 18 | 28 | CPO MFI |
| 6 | alumina | d | 180 | 18 | 21 | CPO MFI |
| 7 | alumina | e | 180 | 20 | 30 | CPO MFI |
| 8 | alumina | f | 180 | 18 | 23 | CPO MFI |
| 9 | SS | a | 180 | 24 | 40 | CPO MFI |

CPO-crystallographic preferred orientation
@ alumina: 0.08 μm pore size; SS = stainless steel, Pall Corporation, PMM Grade M020
a 100 wt % unwashed solution (batch 2)
b 100 wt % washed solution (batch 1)
c 50 wt % washed solution (batch 1); 50 wt % alumina
d 50 wt % unwashed solution (batch 2); 50 wt % alumina
e 10 wt % unwashed solution (batch 4); 90 wt % alumina
f 100 wt % washed solution (batch 3)

EXAMPLE 3
Selectivity Enhancing Coatings Made From Polyimide

A selectivity enhancing coating made from polyimide was applied to zeolite membrane layers (produced using one of the LAI-ISC, GEL/LAI-ISC, or S/LAI-ISC methods described above). The zeolite layer thicknesses ranged from 2 to 25 μm. All of the compositions chosen passed the dye test described in example 1. As such they appeared to be free of defects.

Zeolite compositions were coated utilizing a spin coating apparatus (Headway Research, Inc.). The coating material was a polyimide precursor resin, PIX-8203, from Hitachi Chemical Company, which contained an adhesion promoter. The composition material was initially dried at 120° C. and any dust or foreign material removed with high pressure filtered nitrogen just prior to applying the permeation stabilization coating. The compositions were placed on the spinner and the apparatus set to the desired spin speed and duration, two of the principle factors which determine coating thickness. As the spin speed increases, the coating thickness decreases.

The entire surface of the zeolite layer is next covered with polyimide precursor resin (neat, as received) and allowed to sit, without spinning, in air, for 10 to 20 seconds. Next, the spinner is turned on which spins the material, removing any excess polymer resin from the surface. As an example, the material is spun at a rate of 6000 rpm for 30 seconds which results in a coating layer thickness of 1 mm.

The coated composition in then placed in a 120° C. oven, in argon, for 30 minutes to remove any solvents (inherent to the as received polymer precursor: N-methyl pyrrolidone and/or dimethylacetamide). The oven temperature is then raised (over a one hour period) to 400° C. and held at this temperature for 2 hours. A cross sectional view taken in the scanning electron microscope of a GEL-LAI-ISC composition with a thermally cured polyimide selectivity enhancing coating is shown in FIG. 5.

The method of example 1 and 2 was used to measure the selectivity for the separation of xylene isomers. The maximum selectivities for the separation the xylene isomers was determined. This maximum selectivity is taken to be either the separation factor for the para with respect to the ortho isomer or the separation factor for the para with respect to the meta-isomer, whichever is higher. Three polyimide coated LAI-ISC compositions were tested which showed maximum selectivities in the range from 2.5 to 5. The average maximum selectivity was approximately 3.5. Six polyimide coated GEL-LAI-ISC compositions were measured which showed a maximum selectivity between 4 and 10. The average of these maximum selectivities was approximately 6.5. One S-LAI-ISC composition was measured which showed a maximum selectivity near 5. These maximum selectivities are significantly higher than the selectivities observed for LAI-ISC and GEL-LAI-ISC compositions (described in Examples 1 and 2) that were tested without the selectivity enhancing coating. The selectivites measured are in line with the expected maximum selectivity.

Alternately, different coating thicknesses can be effected by varying the spin rate of the spinner and/or the spinning time duration. A thicker coatings was produced on a GEL-LAI-ISC composition by spinning at 5000. The maximum selectivity for separation of the para isomer from either the meta- or ortho-isomer was 6.

EXAMPLE 4
Repartion Using Silicone Oil

Selectivity enhancing coatings were applied to zeolite membrane layers (produced using one of the LAI-ISC, GEL/LAI-ISC, or S/LAI-ISC methods described above). The zeolite layer thicknesses ranged from 2 to 25 μm. All of the membranes chosen passed the dye test described in Example 1. As such they appeared to be free of defects.

The apparatus depicted in FIG. 1 (Cold Wall Reactor which minimizes ozone degradation outside of the reaction zone) was used to apply selectivity enhancing coatings to the compositions. The Reactor eliminates the need for O-rings in the system and is amenable to large scale fabrication operations.

A model GL-1 ozone generator manufactured by PCI Ozone and Control Systems was used for the experiments. The instrument utilized a plasma discharge system to produce ozone (four weight percent in flowing air, 0.2 SCFM, 5000 cc/min). This stream was split by a mass flow controller so that ~100–300 cc/min reached the reaction zone. The residence time of the ozone in the reaction zone is governed by regulating the reactor temperature, since ozone has a specific half-ife at given temperatures.

With a reactor volume of 50 cc, a reactor pressure of 1 atm, and temperature of 200° C., the residence time of ozone flowing at 300 cc/min was 10 seconds. The liquid phase oxidized by ozone to produce the silicon oxide SEC was Invoil 940 silicone diffusion pump fluid (Inland Vacuum Industries).

The use of this technique to produce selectivity enhancing coatings is illustrated for to ozone assisted CVD coating methods. The first method involves application of a liquid selectivity enhancing coating precursor to the front side of a zeolite layer followed by ozone treatment in the Cold Wall Reactor. The front side of the zeolite layer is taken to be the side of the zeolite layer opposite to the side nearest the porous substrate. The second example illustrates a application of a liquid selectivity enhancing coating precursor to the back side of a zeolite layer followed by ozone treatment in the Cold Wall Reactor.

A) Formation of an Selectivity Enhancing Coating from Front Side Treatment of a GEL/LAI-ISC Zeolite Composition A GEL/LAI-ISC zeolite layer (supported by a porous A16 alumina support) was coated with a thin layer of Invoil 940 silicone diffusion pump fluid (Inland Vacuum Industries) applied by pouring the material directly on top of the zeolite layer. This oil was allowed to stand, in air, on the zeolite crystals, partly permeating into the intercrystalline defects and voids in addition to coating the surfaces of the zeolite crystals. After 5 minutes, any remaining silicone oil was removed from the ceramic by blotting with a towel.

The treated disk was inserted into the Cold Wall Reactor, the entire system placed on a heating plate (at room temperature), and the ozone/air mixture flowed over the surface. The temperature was then raised to 200° C. and held at these conditions for 0.1–4 hours. After ozone treatment, the membrane was cooled and washed with technical grade toluene (drawn through the membrane).

The method of example 1 and 2 was used to measure the selectivity for the separation of xylene isomers, and the maximum selectivities for the separation the xylene isomers was determined. This maximum selectivity is taken to be either the separation factor for the para with respect to the ortho isomer or the separation factor for the para with respect to the meta isomer, whichever is higher. Three GEL-LAI-ISC membranes tested showed maximum selectivities in the range from 3.5 to 5. The average maximum selectivity was approximately ~4. These maximum selectivities are significantly higher than the selectivities observed for LAI-ISC and GEL-LAI-ISC membranes (described in Examples 1 and 2) that were tested without the selectivity enhancing coating. The selectivites measured are in line with the expected maximum selectivity.

B) Formation of a Selectivity Enhancing Coating from Back Side Treatment of a GEL-LAI-ISC Zeolite Composition A GEL/LAI-ISC zeolite layer (supported by a porous A16 alumina support) was placed in Invoil 940 silicone diffusion pump fluid (Inland Vacuum Industries) such that the oil covered the back side of the disk, but did not contact the zeolite layer. The disk was allowed to stand, in air, in the oil, which permeated into the substrate by capillary action. The oil eventually permeated into the intercrystalline defects and voids in the zeolite layer. After 30 minutes, the disk was removed from the oil and any remaining silicone oil was removed from the ceramic by blotting with a towel.

The treated disk was inserted into the Cold Wall Reactor, the entire system placed on a heating surface (at room temperature), and the ozone/air mixture flowed over the surface. The temperature was then raised to 200° C. and held at these conditions for 0.1–4 hours. After ozone treatment, the membrane was cooled and washed with technical grade toluene (drawn through the membrane).

The method of example 1 and 2 was used to measure the selectivity for the separation of xylene isomers. The maximum selectivities for the separation the xylene isomers were determined. One GEL-LAI-ISC membrane tested showed a maximum selectivity near 4.5. Comparing these separation factors with example 2, it is seen that applying the interfacial gas phase reparation technology to GEL-LAI-ISC zeolite membranes, the selectivity for the separation of xylene isomers has been improved.

What is claimed is:

1. A composition having a mass transfer resistance and which allows selective molecules to pass therethrough comprising a substrate, a first layer of contiguous, intergrown zeolite or zeolite-like crystals, a selectivity enhancing coating in contact with the first layer, and a crystalline permeable intermediate layer in contact with the substrate, the first layer being in contact with the intermediate layer;

wherein the first layer ranges in thickness from about 0.1 to 150 micrometer and has pore openings, about 50% of the pore openings being obstructed by the selectivity enhancing coating; and wherein the selectivity enhancing coating is capable of increasing the composition's mass transfer resistance by a factor ranging from about 1 to about 5 and is selected from the group consisting of permeable coatings, impermeable coatings, and mixtures thereof.

2. The composition of claim 1 wherein at least about 50% of the zeolite pore openings remain unblocked by the coating.

3. The composition of claim 1 wherein the coating is a polyimide.

4. The composition of claim 1 wherein the coating comprises a silica oil.

5. The composition of claim 1 wherein the crystalline permeable intermediate layer is a microporous or mesoporous growth enhancing layer containing zeolite.

6. The composition of claim 1 wherein the selectivity enhancing is a coating attenuating the passing of molecules through said composition.

7. The composition of claim 1 wherein the selectivity enhancing is a coating preventing the formation of defects in said composition during use.

8. A composition according to claim 1 where the first layer exhibits an orientation selected from the group consisting of shape preferred orientation, crstallographic preferred orientation, and mixtures thereof.

9. A separation process comprising contacting a feedstock derived from petroleum, natural gas, air or hydrocarbons, comprising at least two molecular species with a composition having a mass transfer resistance and which allows selective molecules to pass therethrough comprising a substrate, a first layer of contiguous, intergrown zeolite or zeolite-like crystals, a selectivity enhancing coating in contact with the first layer, and a crystalline permeable intermediate layer in contact with the substrate, the first layer being in contact with the intermediate layer, wherein the first layer ranges from about 0.1 to 150 micrometers and has pore openings, about 50% of the pore openings being obstructed by the selectivity enhancing coating; and wherein the selectivity enhancing coating is capable of increasing the composition's is mass transfer resistance by a factor ranging from about 1 to about 5 and is selected from the group consisiting of permeable coatings, impermeable coatings, and mixtures thereof;

wherein at least one molecular species of said feedstock is separated from said feedstock by said composition, and wherein said hydrocarbon feedstocks are selected from the group consisting of coal, bitumen, kerogen and mixtures thereof.

10. A process according to claim 9 wherein said molecular species is separated via molecular diffusion.

11. A process according to claim 9 wherein said feedstock is selected from the group consisting of mixed xylenes and ethylbenzene; hydrogen, H2S and ammonia; mixtures of normal and isobutanes; mixtures of normal and isobutenes; kerosene containing normal paraffins; mixtures of nitrogen and oxygen; mixtures of hydrogen and methane; mixtures of hydrogen, ethane and ethylene; mixtures of hydrogen, propane and propylene; coker naphtha containing $C_5$ to $C_{10}$ mixtures containing argon, helium, neon or nitrogen; intermediate reactor catalytic reformer products; fluid catalytic cracking products; naphtha; light coker gas oil; mixtures of normal and isopentanes; mixtures of normal and isopentenes; mixtures of ammonia, hydrogen and nitrogen; mixtures of 10 carbon aromatics, "mixtures of butenes," mixtures of sulfur and nitrogen compounds; mixtures of sulfur compounds; mixtures of nitrogen compounds; mixtures containing benzene and mixtures thereof.

12. A process according to claim 9 wherein said composition adsorbs at least one molecular species of said feedstock.

13. A process for catalyzing a chemical reaction comprising contacting a reaction stream with a composition comprising a substrate, a first layer of contiguous, intergrown zeolite or zeolite-like crystals, a selectivity enhancing coating in contact with the first layer and a crystalline permeable intermediate layer in contact with the substrate, the first layer being in contact with the intermediate layer;

wherein the first layer ranges in thickness from about 0.1 to 150 micrometers and has pore openings, about 50% of the pore openings being obstructed by the selectivity enhancing coating; and wherein the selectivity enhancing coating is capable of increasing the composition's mass transfer resistance by a factor ranging from about 1 to about 5 and is selected from the group consisting of permeable coatings, impermeable coatings, and mixtures thereof.

14. A process according to claim 13 wherein a catalyst forms a module with said composition or is contained within said composition.

15. A process according to claim 14 wherein said feedstock is comprised of mixed xylenes and ethylbenzene; ethane; ethylbenzene; butanes; propane; $C_{10-C_{18}}$ normal paraffins; H2S; catalytic reforming streams; light petroleum gases (LPGs); sulfur and hydrogen compounds; nitrogen compounds; mixed butenes, and mixtures thereof.

16. A process according to claim 14 wherein when said feedstock is reacted with said composition a reactant or reaction product is obtained.

17. A process for catalyzing a chemical reaction which comprises contacting one reactant of a bimolecular reaction mixture with one face of a composition in active catalytic form comprising a substrate, first layer of contiguous, intergrown zeolite or zeolite-like crystals, a selectivity enhancing coating in contact with the first layer, and a crystalline permeable intermediate layer in contact with the substrate, the first layer being in contact with the intermediate layer, wherein the first layer ranges in thickness from about 0.1 to 150 micrometers and has pore openings, about 50% of the pore openings being obstructed by the selectivity enhancing coating; and wherein the selectivity enhancing coating is capable of increasing the composition's mass transfer resistance by a factor ranging from about 1 to about 5 and is selected from the group consisiting of permeable coatings, impermeable coatings, and mixtures thereof; the contacting being conducted under catalytic conversion conditions, and controlling the addition of a second reactant by diffusion from the opposite face of the structure, under catalytic conversion conditions, and controlling the addition of a second reactant by diffusion from the opposite face of the structure.

* * * * *